US012669894B2

(12) United States Patent
Kim et al.

(10) Patent No.: US 12,669,894 B2
(45) Date of Patent: Jun. 30, 2026

(54) TOUCH SENSING DISPLAY APPARATUS

(71) Applicant: LG Display Co., Ltd., Seoul (KR)

(72) Inventors: Ki Yong Kim, Paju-si (KR); Hong Ju Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/978,660

(22) Filed: Dec. 12, 2024

(65) Prior Publication Data

US 2025/0238098 A1     Jul. 24, 2025

(30) Foreign Application Priority Data

Jan. 24, 2024     (KR) ........................ 10-2024-0011194

(51) Int. Cl.
*G06F 3/041* (2006.01)
*G06F 3/044* (2006.01)

(52) U.S. Cl.
CPC ........ *G06F 3/04166* (2019.05); *G06F 3/0443* (2019.05); *G06F 3/0448* (2019.05); *G06F 3/04164* (2019.05); *G06F 2203/04104* (2013.01)

(58) Field of Classification Search
CPC .. G06F 3/04166; G06F 3/0443; G06F 3/0448; G06F 3/04164; G06F 3/0445; G06F 3/0446; G06F 3/0416; G06F 3/044; G06F 2203/04104
See application file for complete search history.

(56) References Cited

U.S. PATENT DOCUMENTS

| | | | | |
|---|---|---|---|---|
| 2014/0111467 A1* | 4/2014 | Chen | ..................... | G06F 3/0446 |
| | | | | 345/174 |
| 2017/0168608 A1* | 6/2017 | Kim | ..................... | G06F 3/0412 |
| 2020/0387248 A1* | 12/2020 | Kim | ..................... | G06F 3/04182 |
| 2021/0397341 A1* | 12/2021 | Ye | ..................... | G06F 3/0446 |
| 2022/0075478 A1* | 3/2022 | Pundak | ..................... | G06F 3/0446 |

FOREIGN PATENT DOCUMENTS

KR     20220015689 A     2/2022

* cited by examiner

*Primary Examiner* — Stephen G Sherman
(74) *Attorney, Agent, or Firm* — Seed Intellectual Property Law Group LLP

(57) ABSTRACT

A touch sensing display device includes a first touch block including a plurality of first touch electrodes and a first additional electrode pattern dividing the plurality of first touch electrodes, a second touch block including a plurality of second touch electrodes and a second additional electrode pattern dividing the plurality of second touch electrodes, a touch driver configured to supply a first periodic signal having a first frequency to the first additional electrode pattern through a first touch block driving line and supply a second periodic signal, having a second frequency which differs from the first frequency, to the second additional electrode pattern through a second touch block driving line, and a touch sensing circuit configured to sense touch lines connecting one of the plurality of first touch electrodes to one of the plurality of second touch electrodes.

20 Claims, 14 Drawing Sheets

Figure 1:
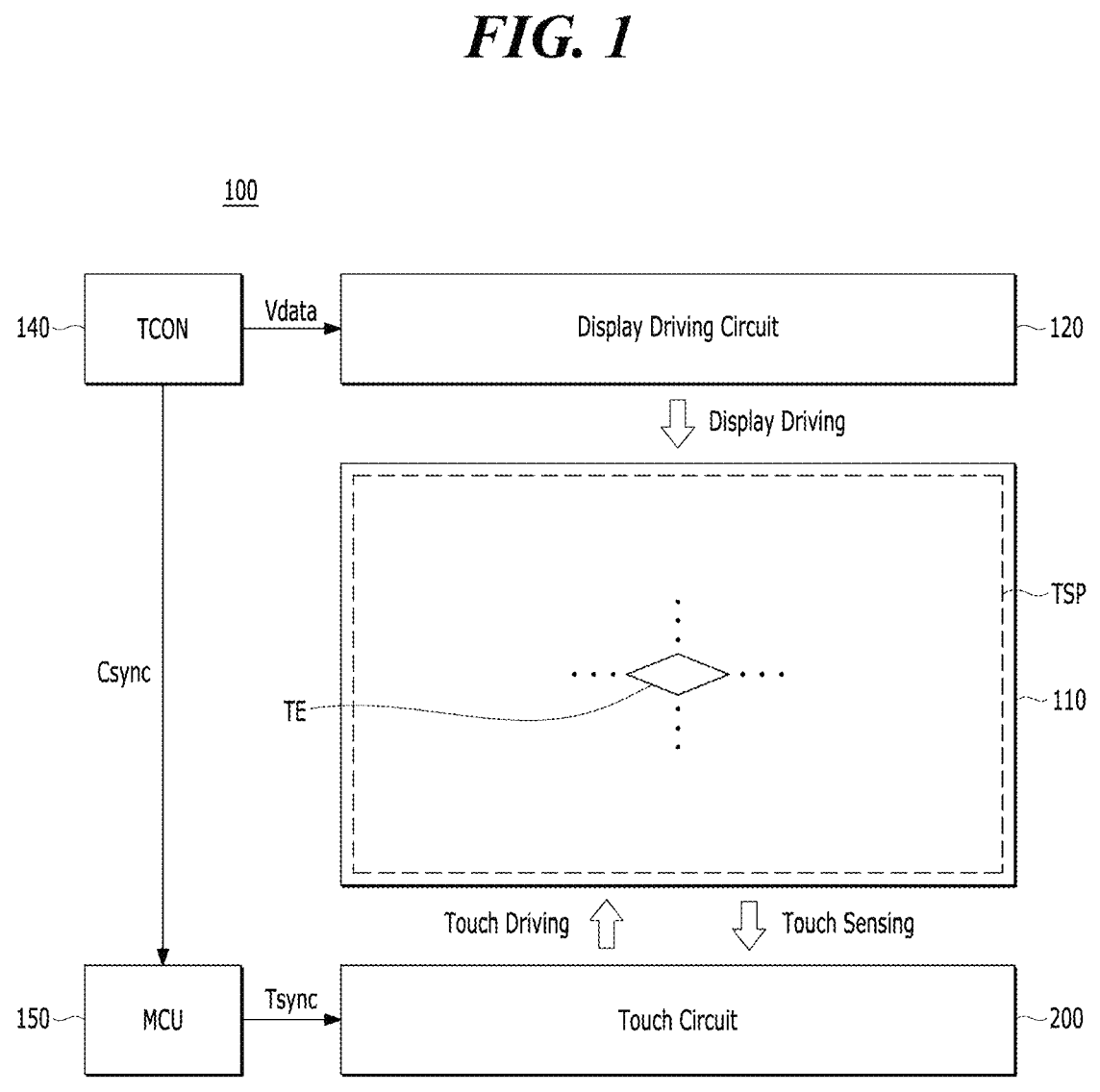

| 140 — TCON | Vdata → | Display Driving Circuit | — 120 |

⇩ Display Driving

TSP

TE

110

Touch Driving ⇧     ⇩ Touch Sensing

| 150 — MCU | Tsync → | Touch Circuit | — 200 |

Csync

TEA

TOUCH SENSING DISPLAY APPARATUS

CROSS-REFERENCE TO RELATED APPLICATIONS

This application claims the benefit of the Korean Patent Application No. 10-2024-0011194 filed on Jan. 24, 2024, which is hereby incorporated by reference as if fully set forth herein.

BACKGROUND

Technical Field

The present disclosure relates to a touch sensing display device.

Description of the Related Art

Touch sensing display device include a display panel including a touch sensor. Because the number of touch electrodes and touch lines increases as display panels enlarge in size, there is a problem where a production yield of display panels is low or the manufacturing cost increases.

Moreover, in a multi-touch input where a display panel is simultaneously touched by two or more fingers or a finger and a stylus pen, a problem may occur where an actually untouched point is abnormally recognized as a touch position due to a ghost phenomenon.

BRIEF SUMMARY

The present disclosure provides a touch sensing display device which may differentiate a real touch position from a ghost position in a multi-touch input and may thus prevent the occurrence of a phenomenon where an actually untouched point is abnormally recognized as a touch position.

As embodied and broadly described herein, a touch sensing display device includes: a first touch block including a plurality of first touch electrodes and a first additional electrode pattern dividing the plurality of first touch electrodes; a second touch block including a plurality of second touch electrodes and a second additional electrode pattern dividing the plurality of second touch electrodes; a touch driver configured to supply a first periodic signal having a first frequency to the first additional electrode pattern through a first touch block driving line and supply a second periodic signal, having a second frequency which differs from the first frequency, to the second additional electrode pattern through a second touch block driving line; and a touch sensing circuit configured to sense touch lines connecting one of the plurality of first touch electrodes to one of the plurality of second touch electrodes.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a diagram schematically illustrating a touch sensing display device according to the present embodiment;

DETAILED DESCRIPTION

Figure 2:
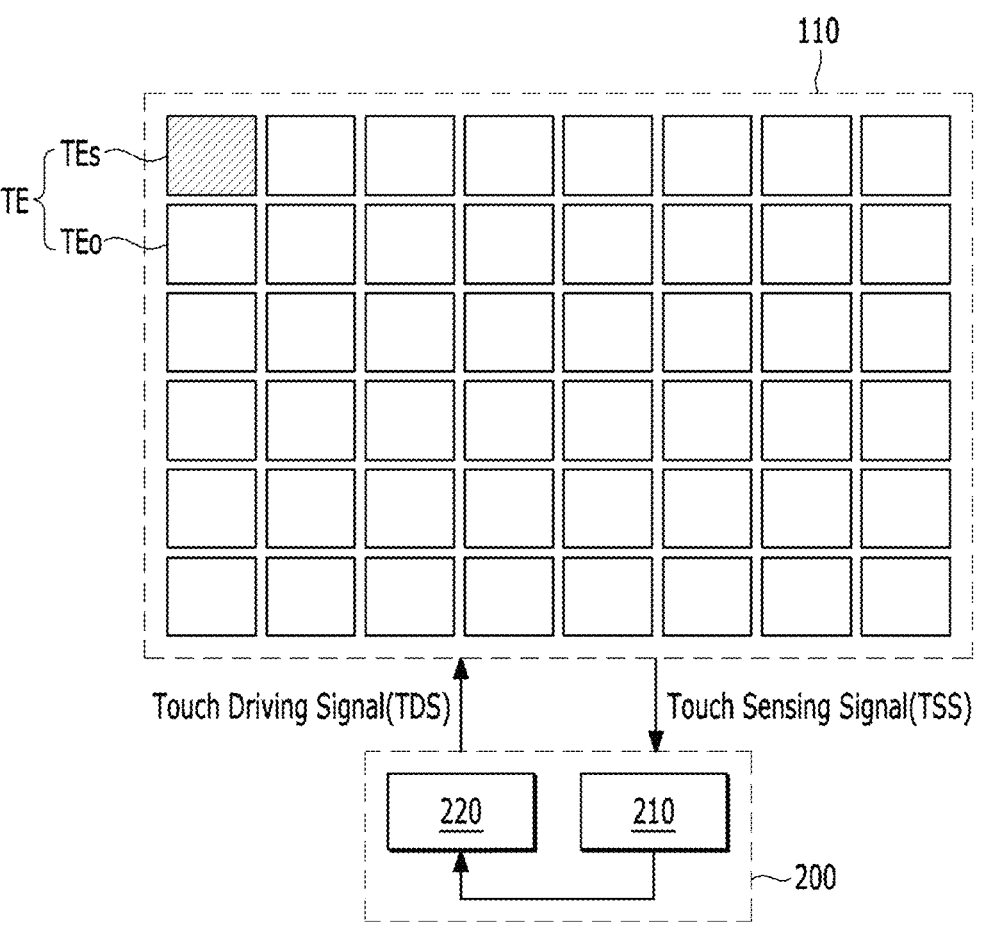
FIG. 2 is a diagram illustrating an example of a touch sensing operation in a touch sensing display device according to the present embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Improvements and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise," "having," "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~," and "next~," one or more other parts may be disposed between the two parts unless "just" or "direct" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram schematically illustrating a touch sensing display device 100 according to the present embodiment.

Referring to FIG. 1, the touch sensing display device 100 according to the present embodiments may provide a display function of reproducing an input image in a screen thereof and a touch sensing function of sensing a touch input of a user.

The touch sensing display device 100 may include a display panel 110 where data lines and gate lines are provided and a display driving circuit 120 for driving the display panel 110.

In terms of functions, the display driving circuit 120 may include a data driving circuit for driving the data lines, a gate driving circuit for driving the gate lines, and a controller for controlling the data driving circuit and the gate driving circuit. The display driving circuit 120 may be implemented as one or more integrated circuits (ICs).

The touch sensing display device 100 may include a touch screen panel TSP where a plurality of touch electrodes TE are disposed for touch sensing and a touch circuit 200 which drives the touch screen panel TSP.

The touch screen panel TSP may be an external type where the touch screen panel TSP is manufactured independently from the display panel 110 and is bonded to the display panel 110, or may be an internal type where the touch screen panel TSP is manufactured together in a manufacturing process of the display panel 110 and is provided in the display panel 110. In the touch sensing display device 100 according to the present embodiment, the touch screen panel TSP may be an independent panel including the touch sensing function, or may denote the display panel 110 which has all of the touch sensing function and the display function. Hereinafter, the internal type where the touch screen panel TSP is in the display panel 110 will be described for example.

The touch circuit 200 may supply a touch driving signal to the display panel 110, may receive a touch sensing signal from the display panel 110, and may detect touch coordinates and whether there is a touch, based on the touch sensing signal. The touch circuit 200 may be implemented as one element or two or more elements (for example, integrated circuit (IC)) and may be implemented independently from the display driving circuit 120. Also, all or a portion of the touch circuit 200 may be integrated and implemented in the display driving circuit 120 or an internal circuit thereof. For example, a portion of the touch circuit 200 may be implemented as an IC along with the data driving circuit of the display driving circuit 120.

The touch sensing display device 100 may include a micro control unit (MCU) 150 which controls the touch circuit 200. The micro control unit 150 may be supplied with a control synchronization signal Csync from a timing controller (TCON) 140 and may generate a touch synchronization signal Tsync for controlling the touch circuit 200, based on the control synchronization signal Csync.

The micro control unit 150 may transfer or receive the touch synchronization signal Tsync, based on an interface defined between the touch circuit 200 and the micro control unit 150. The micro control unit 150 may be formed as one IC type along with a touch controller of the touch circuit 200, or may be implemented as one IC type along with the timing controller 140.

The touch sensing display device 100 may include the timing controller (TCON) 140 which controls the display driving circuit 120 and the micro control unit 150. The timing controller 140 may be supplied with a data signal Vdata of an input video and a timing signal such as a vertical synchronization signal, a horizontal synchronization signal, a data enable signal, and a dot clock from a host system (not shown).

The timing controller 140 may control a gate driving timing of the display driving circuit 120, based on a scan timing control signal such as a gate start pulse, a gate shift clock, and a gate output enable signal. Also, the timing controller 140 may control a data driving timing of the display driving circuit 120, based on a data timing control signal such as a source sampling clock and a source output enable signal.

The touch sensing display device 100 may sense touch coordinates and whether there is a touch, based on a capacitance difference occurring in the touch electrodes TE.

The touch sensing display device 100 may be devices of various types such as a liquid crystal display (LCD) device, an organic light emitting display device, a plasma display panel, and a quantum dot display device.

For example, when the touch sensing display device 100 according to embodiments of the present disclosure is an LCD device, the plurality of touch electrodes TE may be disposed in the display panel 110 and may be common electrodes to which a common voltage for display driving is applied.

FIG. 2 is a diagram illustrating an example of a touch sensing operation in a touch sensing display device 100 according to the present embodiment.

Referring to FIG. 2, the touch sensing display device 100 according to the present embodiment may include a plurality of touch electrodes TE which perform a function of a touch sensor and a touch circuit 200 which sequentially drives the plurality of touch electrodes TE to sense a touch input, so as to provide a touch sensing function.

The touch circuit 200 may drive the plurality of touch electrodes TE in a touch sensing period where touch sensing is performed, and thus, may sense whether there is a touch input and may calculate touch coordinates of a position to which the touch input is applied.

The touch circuit 200 supply a touch driving signal TDS to a first touch electrode TEs corresponding to a touch input position and a second touch electrode TEo which does not correspond to the touch input position, among the plurality of touch electrodes TE. Although described below, the touch driving signal TDS according to the present embodiment may include a plurality of periodic signals having different frequencies. Subsequently, based on a touch sensing signal TSS received from the first touch electrode TEs and the second touch electrode TEo, the touch circuit 200 may calculate one or more of the amount of variation of a capacitance or the amount of variation of a voltage or the amount of variation of a charged voltage of each touch electrode TE, may sense whether there is a touch input, and may calculate touch coordinates of a position to which the touch input is applied.

The touch circuit 200 may include a touch sensing circuit 210 which supplies the touch driving signal TDS to the display panel 110 and obtains the touch sensing signal TSS from the touch electrode TEs at a position corresponding to the touch driving signal TDS and a touch controller 220 which controls generating of a signal associated with touch sensing and performs a touch process of receiving the touch sensing signal TSS from the touch sensing circuit 210 to detect whether there is a touch and calculate touch coordinates.

Here, a touch sensing period where touch sensing is performed may be temporally separated from a display driving period where an image is displayed on the display panel 110, but is not limited thereto. A touch sensing operation may be performed at the same time with a display operation. In the touch sensing period, an alternating current (AC) signal having the same phase and amplitude as those of the touch driving signal TDS may be supplied to a data line and a gate line of the display panel 110, and thus, load free driving for reducing an adverse effect of a parasitic capacitance of the touch electrode TE on a touch sensing result may be performed. In this case, the touch driving signal TDS may be referred to as a load free driving signal.

A size of the touch electrode TE disposed in the display panel 110 may correspond to an area size of one subpixel, or may correspond to an area size of two or more subpixels. Also, each touch electrode TE may be a plate type where there is no opening portion, or may be a mesh type including one or more opening portions. For example, in a case where one touch electrode TE is a mesh type and has a size corresponding to an area size of two or more subpixels, one touch electrode TE may include two or more opening portions, and a position and a size of each of the two or more opening portions may correspond to a position and a size of an emission region of a corresponding subpixel.

The display panel 110 may be a split connection type where each touch electrode TE is individually connected to one touch line, or may be a multi-connection type where the plurality of touch electrodes TE are connected to one touch line in common.

Figure 3:
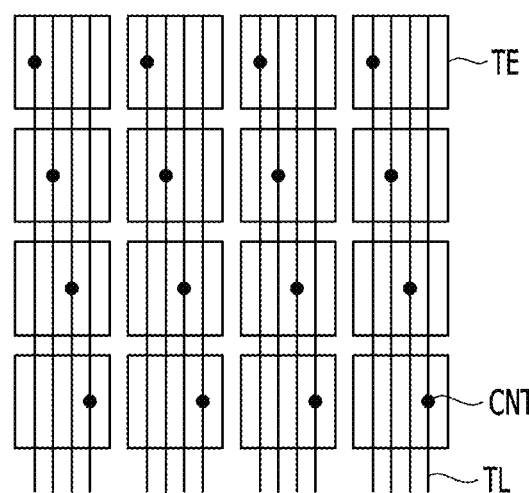
FIG. 3 is a diagram illustrating a touch electrode array of a split connection type.

FIG. 3 is a diagram illustrating a touch electrode array TEA of a split connection type capable of being included in a display panel.

Referring to FIG. 3, in the touch electrode array TEA of the split connection type, each touch electrode TE may be divisionally connected to one touch line. A plurality of touch electrodes TE may be disposed in an active region. Depending on the case, some (for example, an outermost touch electrode) of the plurality of touch electrodes TE may be disposed in an outer region (or an external region) surrounding the active region, or may extend up to the outer region from the active region. Here, the active region may be a region which displays an image, or may be a region capable of touch sensing.

All of a plurality of touch lines TL may be disposed from a point connected to the touch sensing circuit 210 up to an opposite point to have the same length or similar lengths. In each of the plurality of touch lines TL, only a position (e.g., a position of a contact hole CNT) electrically connected to a corresponding touch electrode TE may be changed.

As described above, in the touch electrode array TEA of the split connection type, because one touch electrode TE should be electrically connected to one touch line TL, the number of touch lines TL may need to be equal to the number of touch electrodes TE. Here, the number of touch lines TL may correspond to the number of touch channels for a signal input/output of the touch sensing circuit 210. As in FIG. 3, in a case where the touch electrode array TEA of the split connection type is configured with 4×4 touch electrodes, sixteen touch lines TL respectively connected to sixteen touch electrode TE may be disposed in the touch electrode array TEA, and thus, sixteen touch channels may be needed.

Figure 4:
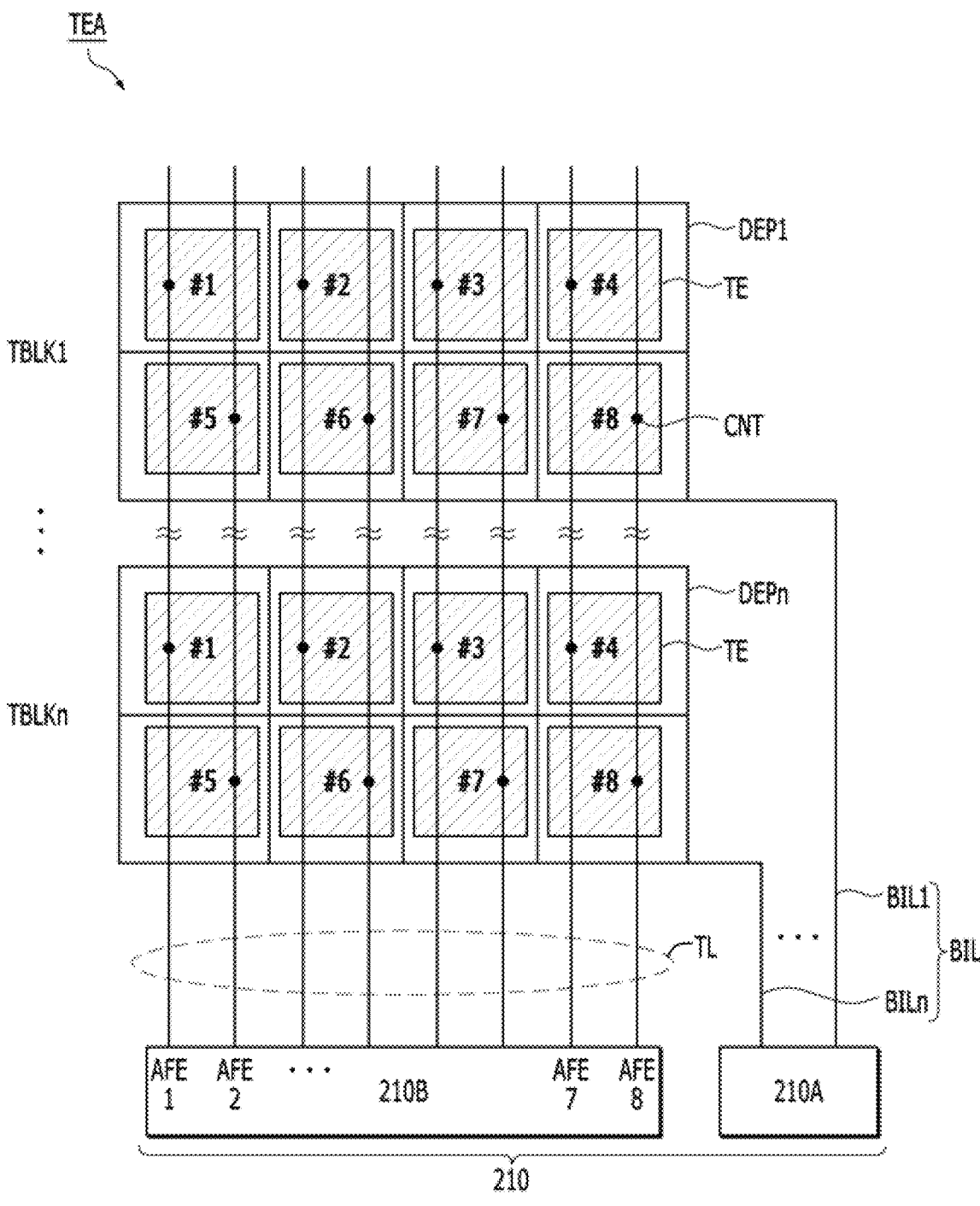
FIG. 4 is a diagram illustrating a touch electrode array of a multi-connection type and a touch sensing circuit connected thereto, according to the present embodiment.

FIG. 4 is a diagram illustrating a touch electrode array TEA of a multi-connection type capable of being included in a display panel.

Referring to FIG. 4, in the touch electrode array TEA of the multi-connection type, a plurality of touch electrodes TE may be connected to one touch line TL through different contact holes CNT in common. The multi-connection type may more easily decrease the number of touch lines TL (e.g., the number of touch channels) than the split connection type. Because the number of touch electrodes and touch lines TL increases as display panels enlarge in size, a production yield of display panels may be low or the manufacturing cost may increase. Such a problem may be effectively solved by the multi-connection type.

The touch electrode array TEA of the multi-connection type may include a plurality of touch blocks TBLK1 to TBLKn (where n may be a natural number of more than 1). Sizes of the plurality of touch blocks TBLK1 to TBLKn may be equal to each other.

Touch electrodes TE of positions corresponding to each other between or among the plurality of touch blocks TBLK1 to TBLKn may be connected to one or a same touch line TL. For example, in a case where each touch block is configured with 4×2 touch electrodes TE, touch electrodes TE #1 of (1,1) position may be connected to a first analog-front end AFE1 through a first touch line TL, touch electrodes TE #5 of (2,1) position may be connected to a second analog-front end AFE2 through a second touch line TL, and touch electrodes TE #2 of (1,2) position may be connected to a third analog-front end AFE3 through a third touch line TL. In this manner, touch electrodes TE #8 of (2,4) position may be connected to an eighth analog-front end AFE8 through an eighth touch line TL. Accordingly, the multi-connection type may decrease by the number of touch lines TL and the number of analog-front ends AFE1 to AFE8 (1/touch block number) compared to the split connection type.

The touch lines TL may be disposed in the active region. Depending on the case, all or some of the touch lines TL may be disposed outside the active region. In a case where the touch lines TL are disposed in the active region, the touch lines TL may be disposed on a layer which differs from the touch electrodes TE and may overlap the touch electrodes TE.

In the touch electrode array TEA of the multi-connection type, when a multi-touch is simultaneously input to the plurality of touch blocks TBLK1 to TBLKn, a ghost phenomenon which is a type of touch distortion may occur. A ghost may occur at a ghost point 1, based on an actually touched real touch 1, and a ghost may occur at a ghost point 2, based on an actually touched real touch 2. The reason that a ghost occurs may be because touch electrodes TE of positions corresponding to each other between the plurality of touch blocks TBLK1 to TBLKn are connected to one touch line TL. Actually touched positions may be real touches 1 and 2 and may be two points, and positions recognized as a touch may be real touches 1 and 2 and ghost points 1 and 2 and may be four points.

In the touch electrode array TEA of the multi-connection type, in order to differentiate a real touch block having a real touch point from a ghost touch block having a ghost point, the present embodiment may apply periodic signals having different frequencies to the plurality of touch blocks TBLK1 to TBLKn and may calculate a size difference between a touch point and a non-touch point through a frequency detection operation based on touch sensing data obtained from the plurality of touch blocks TBLK1 to TBLKn. Each touch sensing data may include a plurality of frequency components, but the present embodiment may obtain a changed size in only a frequency component of an actually touched position through a frequency detection operation. The present embodiment may obtain sensing data of a changed size in only an actually touched position, and thus, may detect an accurate touch input position even when a multi-touch is input.

In other words, in the touch electrode array TEA of the multi-connection type, a plurality of touch block driving lines BIL may be provided for determining whether a touch input is performed in one of the plurality of touch blocks TBLK1 to TBLKn. The number of touch block driving lines BIL may need to be equal to the number of touch blocks. For example, in FIG. 4, the number of touch block driving lines BIL may be an 'n' number.

A first touch block driving line BIL1 may be connected to a first additional electrode pattern DEP1 included in a first touch block TBLK1. In the first touch block TBLK1, the first additional electrode pattern DEP1 may divide or partition a plurality of first touch electrodes TE. That is, the first additional electrode pattern DEP1 may have a mesh shape to surround each of the plurality of first touch electrodes TE, in the same plane (or the same layer). In some implementations, the first additional electrode pattern DEP1 does not abut or is not in physical contact with the plurality of first touch electrodes. In some implementations, the first additional electrode pattern is positioned between every two adjacent first touch electrodes of the plurality of first touch electrodes. The first touch block driving line BIL1 may be formed to extend from the first additional electrode pattern DEP1, in the same plane. Also, the first touch block driving line BIL1 may be disposed in a plane which differs from the first additional electrode pattern DEP1 and may be connected to the first additional electrode pattern DEP1 through a contact hole.

An $n^{th}$ touch block driving line BILn may be connected to an $n^{th}$ additional electrode pattern DEPn included in an $n^{th}$ touch block TBLKn. In the $n^{th}$ touch block TBLKn, the $n^{th}$ additional electrode pattern DEPn may divide or partition a plurality of $n^{th}$ touch electrodes TE. That is, the $n^{th}$ additional electrode pattern DEPn may have a mesh shape to surround each of the plurality of second touch electrodes TE, in the same plane (or the same layer). The $n^{th}$ touch block driving line BILn may be formed to extend from the $n^{th}$ additional electrode pattern DEPn, in the same plane. Also, the $n^{th}$ touch block driving line BILn may be disposed in a plane which differs from the $n^{th}$ additional electrode pattern DEPn and may be connected to the $n^{th}$ additional electrode pattern DEPn through a contact hole. In some implementations, touch blocks TBLK1 and TBLKn do not share any touch block and the plurality of touch electrodes in the touch blocks TBLK1 and TBLKn do not overlap one another.

In the present embodiment, the first additional electrode pattern DEP1 may be disposed in the same layer as the first touch electrodes TE, or may be disposed in a layer which differs from the touch lines TL. Likewise, the $n^{th}$ additional electrode pattern DEPn may be disposed in the same layer as the second touch electrodes TE, or may be disposed in a layer which differs from the touch lines TL.

In the present embodiment, the touch sensing circuit 210 may be divided into a touch driver 210A and a touch sensing unit 210B.

The touch driver 210A may simultaneously drive the first touch block driving line BIL1 connected to the first additional electrode pattern DEP1 and the $n^{th}$ touch block driving line BILn connected to the $n^{th}$ additional electrode pattern DEPn. The touch driver 210A may generate a first periodic signal having a first frequency and a second periodic signal having a second frequency which differs from the first frequency. The touch driver 210A may supply the first periodic signal having the first frequency to the first additional electrode pattern DEP1 through the first touch block driving line BIL1 and may supply the second periodic signal having the second frequency to the $n^{th}$ additional electrode pattern DEPn through the $n^{th}$ touch block driving line BILn. The touch driver 210A may perform a function of a TX driver.

In the first touch block TBLK1, the first additional electrode pattern DEP1 may perform a function of a transmission antenna for transmitting the first periodic signal, and the first touch electrodes TE may perform a function of a reception antenna for receiving the first periodic signal. In the $n^{th}$ touch block TBLKn, the $n^{th}$ additional electrode pattern DEPn may perform a function of a transmission antenna for transmitting the second periodic signal, and the second touch electrodes TE may perform a function of a reception antenna for receiving the second periodic signal.

The touch sensing unit 210B may sense a touch input corresponding to each of the plurality of touch blocks TBLK1 to TBLKn through the touch lines TL of the multi-connection type, which connects one of the first touch electrodes TE to one of the second touch electrodes TE. The touch sensing unit 210B may perform a function of an RX driver.

For example, the touch sensing unit 210B may sense a sum signal of the first periodic signal having the first frequency and the second periodic signal having the second frequency through each of the touch lines TL and may convert a touch line-based sensing signal, obtained through sensing, into a frequency domain signal.

Here, the touch line-based sensing signal may represent one of a first magnitude and a second magnitude in a first frequency of the frequency domain signal and may represent one of a third magnitude and a fourth magnitude in a second frequency of the frequency domain signal. In this case, the first magnitude and the third magnitude may correspond to a non-touch input, the second magnitude and the fourth magnitude may correspond to a touch input, the second magnitude may be less than the first magnitude, and the fourth magnitude may be less than the third magnitude.

Figure 5:
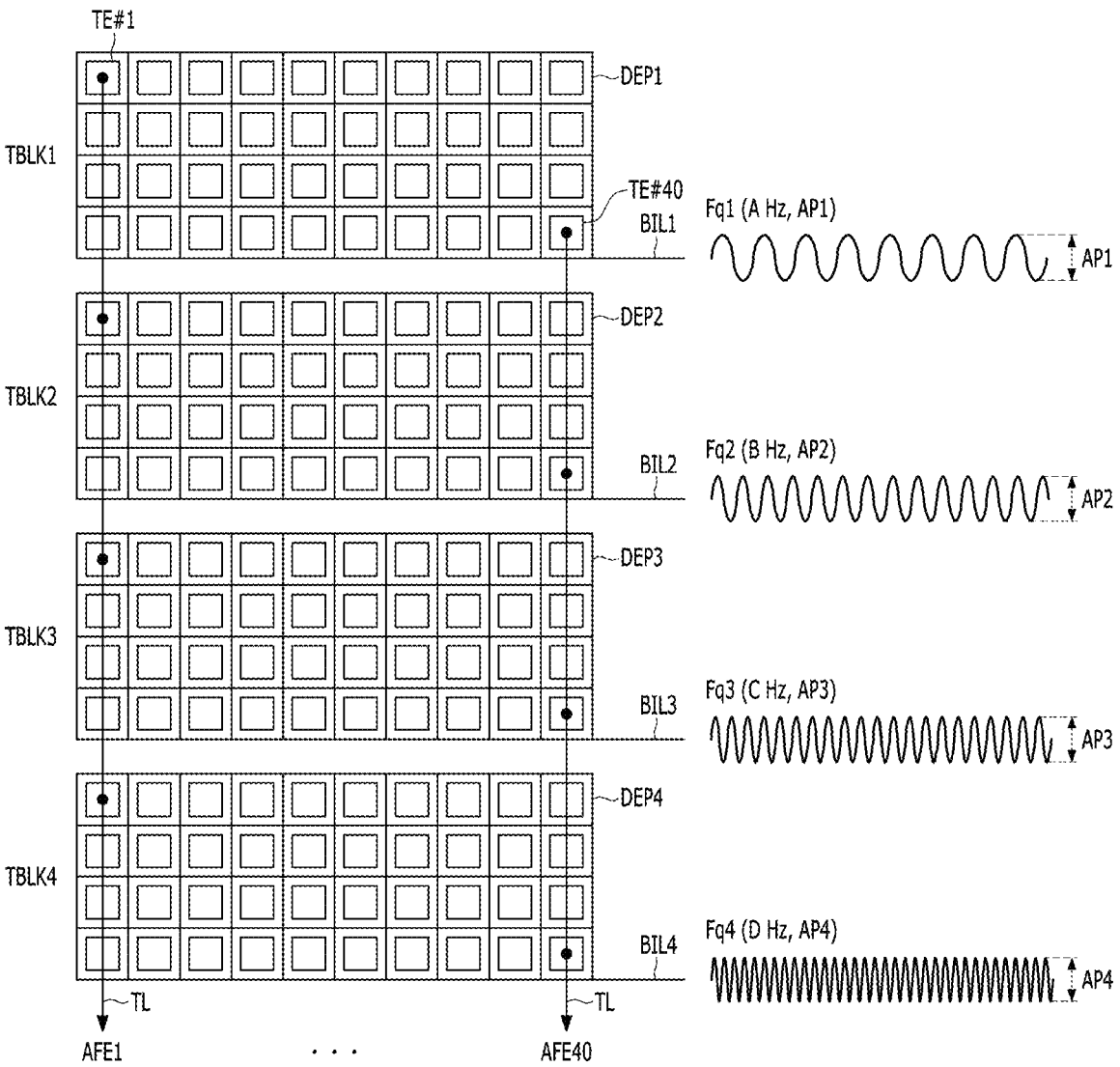
FIG. 5 is a diagram illustrating a plurality of touch block driving signals applied to a touch electrode array of a multi-connection type according to the present embodiment.

FIG. 5 is a diagram illustrating a plurality of touch block driving signals applied to a touch electrode array of a multi-connection type according to the present embodiment.

The touch driver 210A may supply a first touch block driving signal Fq1, which is for implementing first touch sensitivity, to the first additional electrode pattern DEP1 of the first touch block TBLK1 through the first touch block driving line BIL1. The first touch block driving signal Fq1 may be a first periodic signal having a first frequency A Hz and a first magnitude AP1.

The touch driver 210A may supply a second touch block driving signal Fq2, which is for implementing second touch sensitivity, to the second additional electrode pattern DEP2 of the second touch block TBLK2 through the second touch block driving line BIL2. The second touch block driving signal Fq2 may be a second periodic signal having a second frequency B Hz and a second magnitude AP2.

The touch driver 210A may supply a third touch block driving signal Fq3, which is for implementing third touch sensitivity, to the third additional electrode pattern DEP3 of the third touch block TBLK3 through the third touch block driving line BIL3. The third touch block driving signal Fq3 may be a third periodic signal having a third frequency C Hz and a third magnitude AP3.

The touch driver 210A may supply a fourth touch block driving signal Fq4, which is for implementing fourth touch sensitivity, to the fourth additional electrode pattern DEP4 of the fourth touch block TBLK4 through the fourth touch block driving line BIL4. The fourth touch block driving signal Fq4 may be a fourth periodic signal having a fourth frequency D Hz and a fourth magnitude AP4.

To increase touch differentiation performance, the first to fourth frequencies A, B, C, and D Hz may differ. The first to fourth magnitudes AP1 to AP4 may be equal to one another, or may differ. However, in order to increase touch differentiation performance, it may be preferable that the first to fourth magnitudes AP1 to AP4 differ.

The touch sensing unit 210B may include 40 analog-front ends AFE1 to AFE40 respectively connected to 40 touch lines TL.

A first analog-front end AFE1 may sense a first sum signal of the first periodic signal having the first frequency A Hz, the second periodic signal having the second frequency B Hz, the third periodic signal having the third frequency C Hz, and the fourth periodic signal having the fourth frequency D Hz through a first touch line TL connected to touch electrodes TE #1. In a frequency domain of the first sum signal, as a magnitude variation corresponding to each of the first to fourth frequencies A, B, C, and D Hz is analyzed, whether there is a touch input and a touch position may be detected.

Likewise, a 40$^{th}$ analog-front end AFE40 may sense a 40$^{th}$ sum signal of the first periodic signal having the first frequency A Hz, the second periodic signal having the second frequency B Hz, the third periodic signal having the third frequency C Hz, and the fourth periodic signal having the fourth frequency D Hz through a 40$^{th}$ touch line TL connected to touch electrodes TE #40. In a frequency domain of the 40$^{th}$ sum signal, as a magnitude variation corresponding to each of the first to fourth frequencies A, B, C, and D Hz is analyzed, whether there is a touch input and a touch position may be detected.

Figure 6:
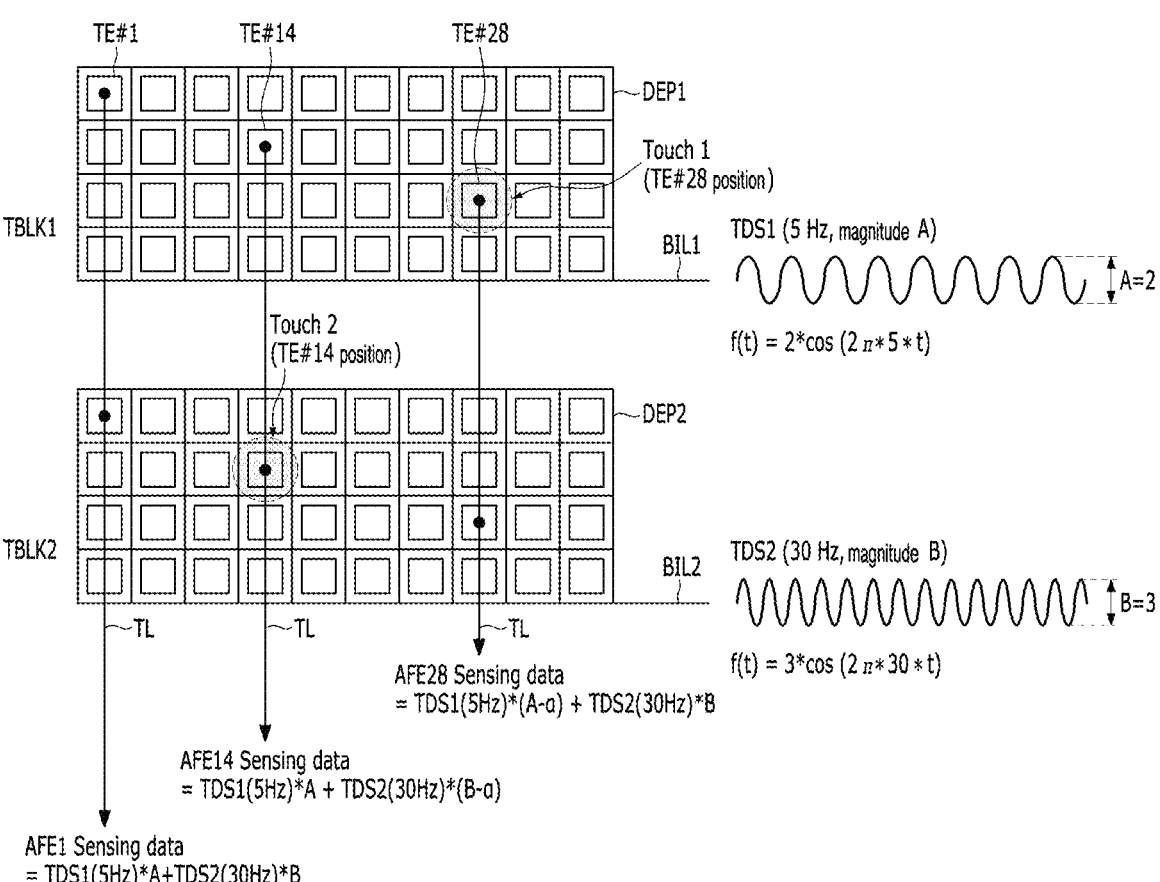
FIG. 6 is a diagram illustrating an example of a touch sensing operation on a touch electrode array of a multi-connection type according to the present embodiment.
Figure 7A:
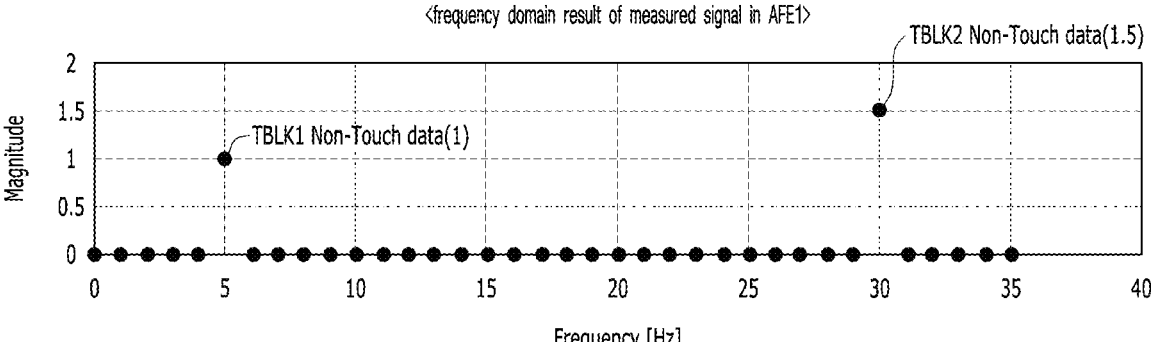
FIG. 7A is a diagram illustrating a frequency domain conversion result of a sensing signal obtained in a first analog-front end of FIG. 6.
Figure 7B:
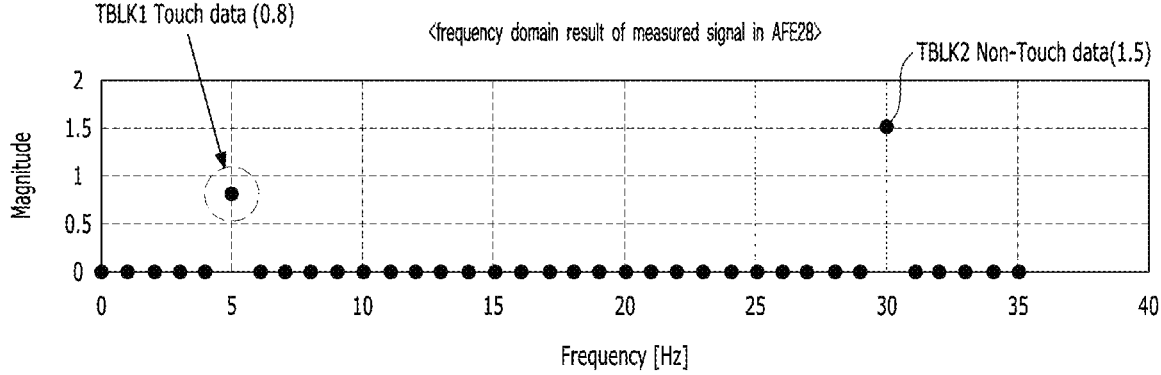
FIG. 7B is a diagram illustrating a frequency domain conversion result of a sensing signal obtained in a $28^{th}$ analog-front end of FIG. 6.
Figure 7C:
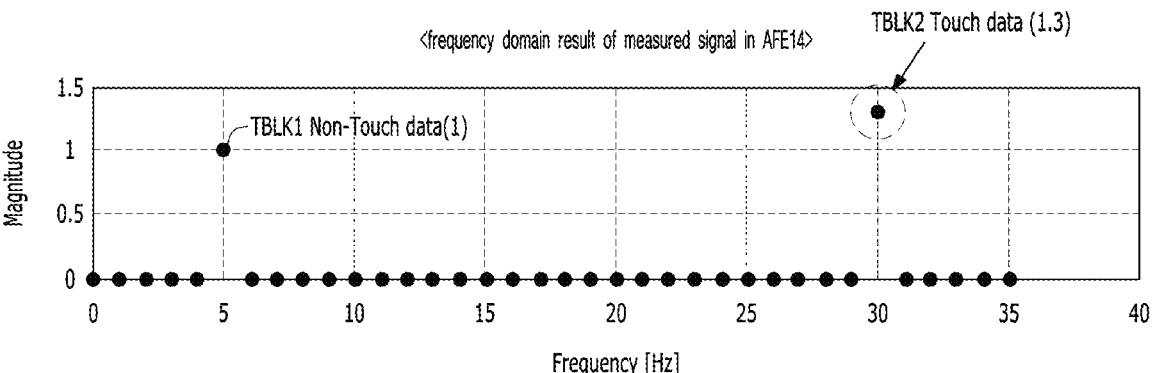
FIG. 7C is a diagram illustrating a frequency domain conversion result of a sensing signal obtained in a $14^{th}$ analog-front end of FIG. 6.

FIG. 6 is a diagram illustrating an example of a touch sensing operation on a touch electrode array of a multi-connection type according to the present embodiment. FIG. 7A is a diagram illustrating a frequency domain conversion result of a sensing signal obtained in a first analog-front end of FIG. 6. FIG. 7B is a diagram illustrating a frequency domain conversion result of a sensing signal obtained in a 28$^{th}$ analog-front end of FIG. 6. FIG. 7C is a diagram illustrating a frequency domain conversion result of a sensing signal obtained in a 14$^{th}$ analog-front end of FIG. 6.

Referring to FIG. 6, the touch driver 210A may supply a first touch block driving signal TDS1, which is for implementing first touch sensitivity, to a first additional electrode pattern DEP1 of a first touch block TBLK1 through a first touch block driving line BIL1. The first touch block driving signal TDS1 may be a first periodic signal having a first frequency (5 Hz) and a first magnitude (A, A=2).

The touch driver 210A may supply a second touch block driving signal TDS2, which is for implementing second touch sensitivity, to a second additional electrode pattern DEP2 of a second touch block TBLK2 through a second touch block driving line BIL2. The second touch block driving signal TDS2 may be a second periodic signal having a second frequency (30 Hz) and a second magnitude (B, B=3).

A first analog-front end AFE1 of the touch sensing unit 210B may sense a first sum signal (AFE1 Sensing data) of a first periodic signal "f(t)=2\*cos(2π\*5\*t)" having a first frequency (5 Hz) and a first magnitude (2) and a second periodic signal "f(t)=3\*cos(2π\*30\*t)" having a second frequency (30 Hz) and a second magnitude (3) through a first touch line TL connected to touch electrodes TE #1. As in FIG. 7A, in a frequency domain of the first sum signal (AFE1 Sensing data), as a magnitude variation corresponding to each of the first frequency (5 Hz) and the second frequency (30 Hz) is analyzed, whether there is a touch input and a touch position may be detected. That is, because a touch input is not applied to the touch electrodes TE #1, there may be no magnitude variation corresponding to each of the first frequency (5 Hz) and the second frequency (30 Hz). A magnitude corresponding to the first frequency (5 Hz) and a magnitude corresponding to the second frequency (30 Hz) may be detected to be 1 (corresponding half of the first magnitude (2)) and 1.5 (corresponding half of the second magnitude (3)), which are reference values.

A 28$^{th}$ analog-front end AFE28 of the touch sensing unit 210B may sense a 28$^{th}$ sum signal (AFE28 Sensing data) of a first periodic signal "f(t)=2\*cos(2π\*5\*t)" having the first frequency (5 Hz) and the first magnitude (2) and a second periodic signal "f(t)=3\*cos(2π\*30\*t)" having the second frequency (30 Hz) and the second magnitude (3) through a 28th touch line TL connected to touch electrodes TE #28. As in FIG. 7B, in a frequency domain of the 28th sum signal (AFE28 Sensing data), as a magnitude variation corresponding to each of the first frequency (5 Hz) and the second frequency (30 Hz) is analyzed, whether there is a touch input and a touch position may be detected. That is, because a touch input is not applied to the touch electrodes TE #28 of the second touch block TBLK2, a magnitude corresponding to the second frequency (30 Hz) may be detected to be 1.5 which is a reference value, without variation. On the other hand, because a touch input is applied to the touch electrodes TE #28 of the first touch block TBLK1, a magnitude corresponding to the first frequency (5 Hz) may be changed to 0.8 which is less than 1 which is the reference value and may be detected.

A $14^{th}$ analog-front end AFE14 of the touch sensing unit 210B may sense a $14^{th}$ sum signal (AFE14 Sensing data) of a first periodic signal "f(t)=2*cos(2π*5*t)" having the first frequency (5 Hz) and the first magnitude (2) and a second periodic signal "f(t)=3*cos(2π*30*t)" having the second frequency (30 Hz) and the second magnitude (3) through a $14^{th}$ touch line TL connected to touch electrodes TE #14. As in FIG. 7C, in a frequency domain of the $14^{th}$ sum signal (AFE14 Sensing data), as a magnitude variation corresponding to each of the first frequency (5 Hz) and the second frequency (30 Hz) is analyzed, whether there is a touch input and a touch position may be detected. That is, because a touch input is not applied to the touch electrodes TE #14 of the first touch block TBLK1, a magnitude corresponding to the first frequency (5 Hz) may be detected to be 1 which is the reference value, without being changed. On the other hand, because a touch input is applied to the touch electrodes TE #14 of the second touch block TBLK2, a magnitude corresponding to the second frequency (30 Hz) may be changed to 1.3 which is less than 1.5 which is the reference value and may be detected.

Figure 8:
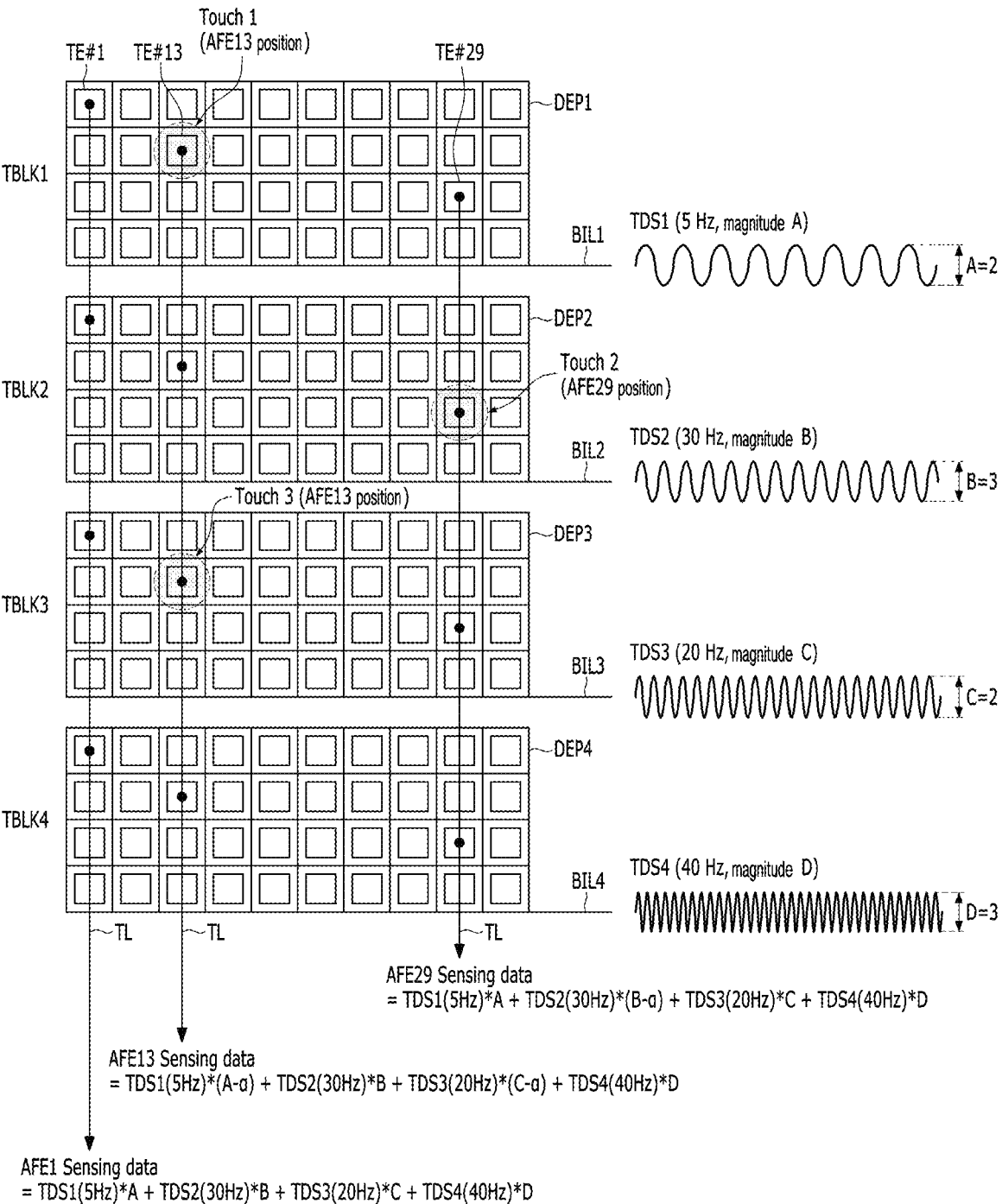
FIG. 8 is a diagram illustrating another example of a touch sensing operation on a touch electrode array of a multi-connection type according to the present embodiment.
Figure 9A:
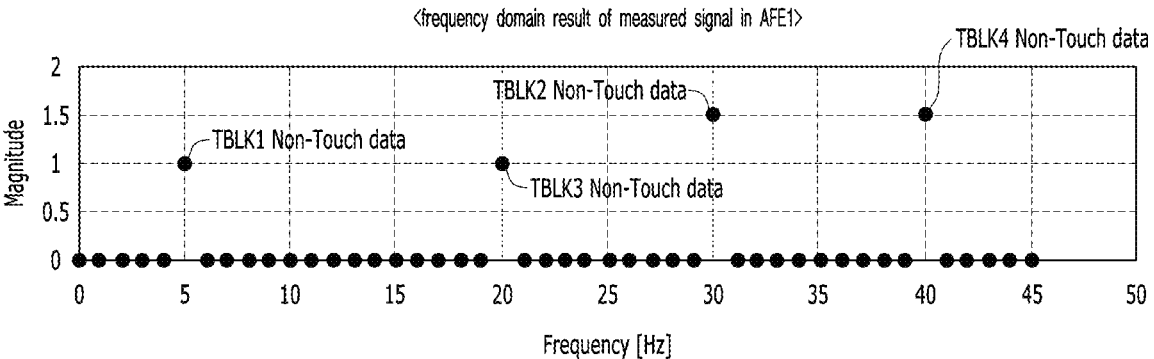
FIG. 9A is a diagram illustrating a frequency domain conversion result of a sensing signal obtained in a first analog-front end of FIG. 8.
Figure 9B:
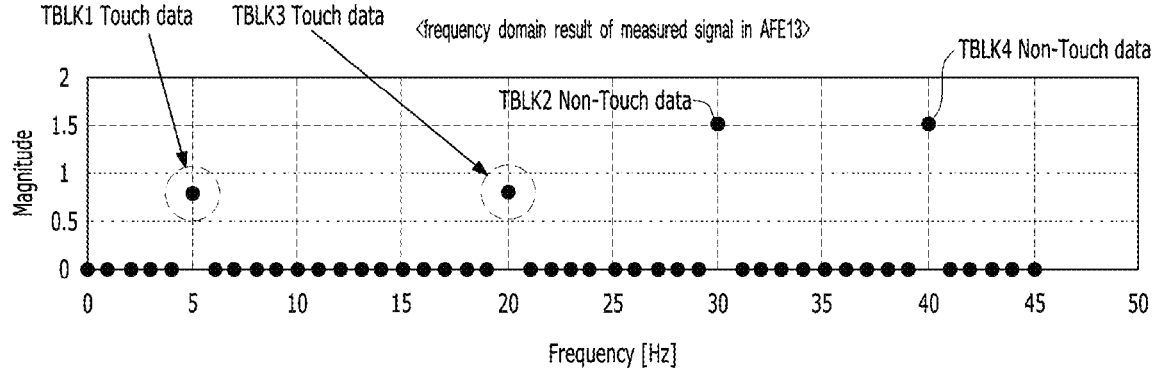
FIG. 9B is a diagram illustrating a frequency domain conversion result of a sensing signal obtained in a $13^{th}$ analog-front end of FIG. 8.
Figure 9C:
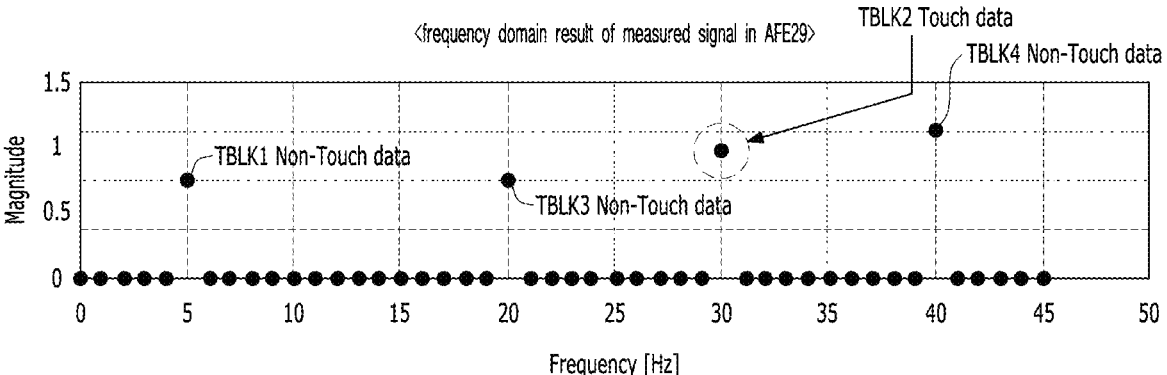
FIG. 9C is a diagram illustrating a frequency domain conversion result of a sensing signal obtained in a $29^{th}$ analog-front end of FIG. 8.

FIG. 8 is a diagram illustrating another example of a touch sensing operation on a touch electrode array of a multi-connection type according to the present embodiment. FIG. 9A is a diagram illustrating a frequency domain conversion result of a sensing signal obtained in a first analog-front end AFE1 of FIG. 8. FIG. 9B is a diagram illustrating a frequency domain conversion result of a sensing signal obtained in a $13^{th}$ analog-front end AFE13 of FIG. 8. FIG. 9C is a diagram illustrating a frequency domain conversion result of a sensing signal obtained in a $29^{th}$ analog-front end AFE29 of FIG. 8.

Referring to FIG. 8, the touch driver 210A may supply a first touch block driving signal TDS1, which is for implementing first touch sensitivity, to a first additional electrode pattern DEP1 of a first touch block TBLK1 through a first touch block driving line BIL1. The first touch block driving signal TDS1 may be a first periodic signal having a first frequency (5 Hz) and a first magnitude (A, A=2).

The touch driver 210A may supply a second touch block driving signal TDS2, which is for implementing second touch sensitivity, to a second additional electrode pattern DEP2 of a second touch block TBLK2 through a second touch block driving line BIL2. The second touch block driving signal TDS2 may be a second periodic signal having a second frequency (30 Hz) and a second magnitude (B, B=3).

The touch driver 210A may supply a third touch block driving signal TDS3, which is for implementing third touch sensitivity, to a third additional electrode pattern DEP3 of a third touch block TBLK3 through a third touch block driving line BIL3. The third touch block driving signal TDS3 may be a third periodic signal having a third frequency (20 Hz) and a third magnitude (C, C=2).

The touch driver 210A may supply a fourth touch block driving signal TDS4, which is for implementing fourth touch sensitivity, to a fourth additional electrode pattern DEP4 of a fourth touch block TBLK4 through a fourth touch block driving line BIL4. The fourth touch block driving signal TDS4 may be a fourth periodic signal having a fourth frequency (40 Hz) and a fourth magnitude (D, D=3).

A first analog-front end AFE1 of the touch sensing unit 210B may sense a first sum signal (AFE1 Sensing data) based on the first to fourth touch block driving signals TDS1 to TDS4 through a first touch line TL connected to touch electrodes TE #1. As in FIG. 9A, in a frequency domain of the first sum signal (AFE1 Sensing data), as a magnitude variation corresponding to each of the first to fourth frequencies (5, 20, 30, and 40 Hz) is analyzed, whether there is a touch input and a touch position may be detected. That is, because a touch input is not applied to the touch electrodes TE #1, there may be no magnitude variation corresponding to each of the first to fourth frequencies (5, 20, 30, and 40 Hz). A magnitude corresponding to the first frequency (5 Hz) and a magnitude corresponding to the second frequency (30 Hz) may be detected to be 1 which is a reference value, without being changed, and a magnitude corresponding to the second frequency (30 Hz) and a magnitude corresponding to the fourth frequency (40 Hz) may be detected to be 1.5 which is a reference value, without being changed.

A $13^{th}$ analog-front end AFE13 of the touch sensing unit 210B may sense a 13th sum signal (AFE13 Sensing data) based on the first to fourth touch block driving signals TDS1 to TDS4 through a 13th touch line TL connected to touch electrodes TE #13. As in FIG. 9B, in a frequency domain of the 13th sum signal (AFE13 Sensing data), as a magnitude variation corresponding to each of the first to fourth frequencies (5, 20, 30, and 40 Hz) is analyzed, whether there is a touch input and a touch position may be detected. That is, because a touch input is applied to the touch electrodes TE #13 of the first and third touch blocks TBLK1 and TBLK3, a magnitude corresponding to the first frequency (5 Hz) may be changed to 0.8 which is less than 1 which is the reference value and may be detected, and moreover, a magnitude corresponding to the third frequency (20 Hz) may be changed to 0.8 which is less than 1 which is the reference value and may be detected. On the other hand, because a touch input is not applied to the touch electrodes TE #13 of the second and fourth touch blocks TBLK2 and TBLK4, a magnitude corresponding to the second frequency (30 Hz) may be detected to be 1.5 which is the reference value, without being changed, and moreover, a magnitude corresponding to the fourth frequency (40 Hz) may be detected to be 1.5 which is the reference value, without being changed.

A $29^{th}$ analog-front end AFE29 of the touch sensing unit 210B may sense a $29^{th}$ sum signal (AFE29 Sensing data) based on the first to fourth touch block driving signals TDS1 to TDS4 through a 29th touch line TL connected to touch electrodes TE #29. As in FIG. 9C, in a frequency domain of the 29th sum signal (AFE29 Sensing data), as a magnitude variation corresponding to each of the first to fourth frequencies (5, 20, 30, and 40 Hz) is analyzed, whether there is a touch input and a touch position may be detected. That is, because a touch input is not applied to the touch electrodes TE #29 of the first, third, and fourth touch blocks TBLK1, TBLK3, and TBLK4, a magnitude corresponding to the first frequency (5 Hz) may be detected to be 1 which is the reference value, without being changed, a magnitude corresponding to the third frequency (20 Hz) may be detected to be 1 which is the reference value, without being changed, and a magnitude corresponding to the fourth frequency (40 Hz) may be detected to be 1.5 which is the reference value, without being changed. On the other hand, because a touch input is applied to the touch electrodes TE #29 of the second touch block TBLK2, a magnitude corresponding to the second frequency (30 Hz) may be changed to 1.3 which is less than 1.5 which is the reference value and may be detected.

Figure 10:
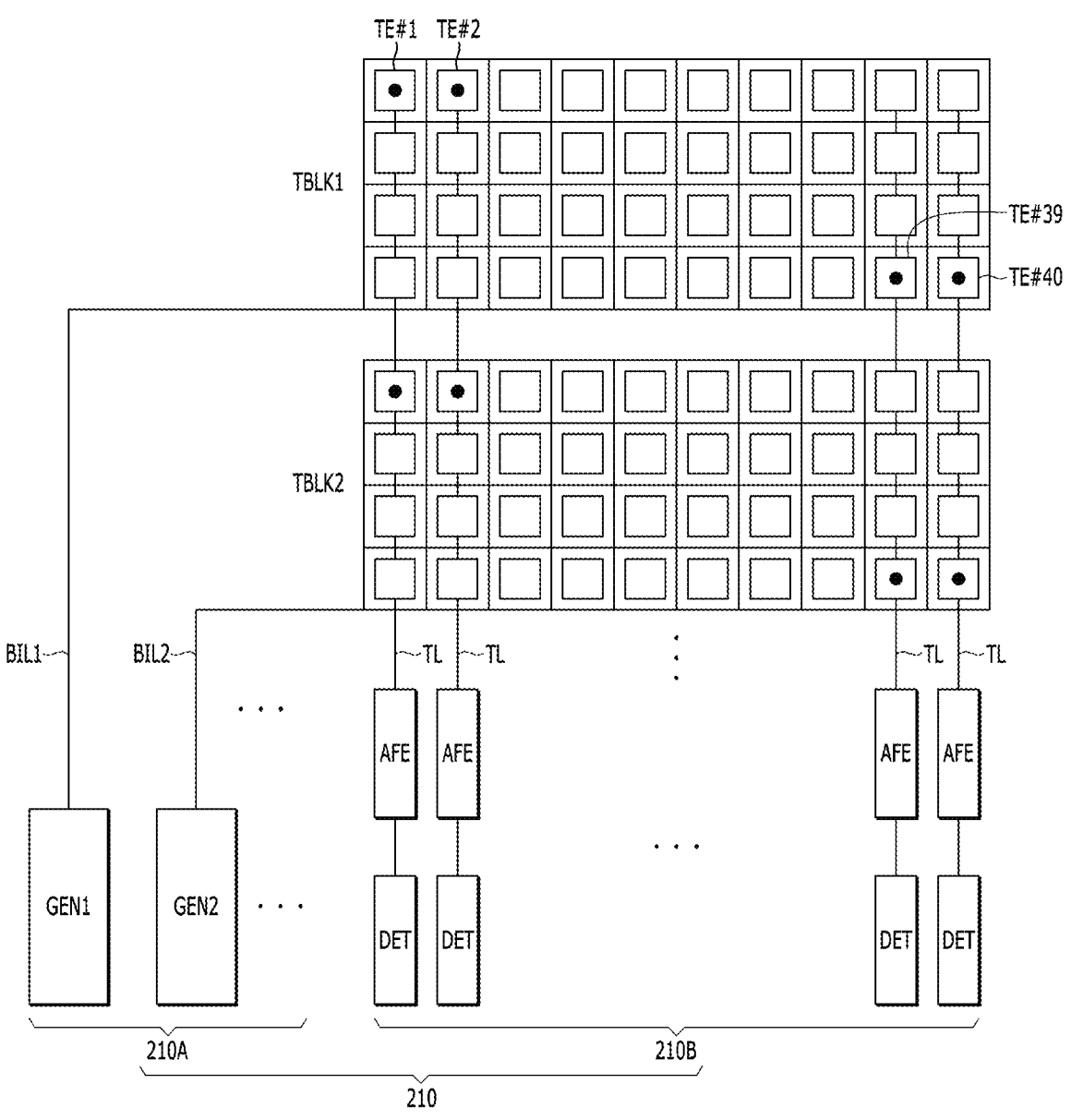
FIGS. 10 and 11 are diagrams illustrating a connection configuration of a touch sensing circuit according to the present embodiment.
Figure 11:
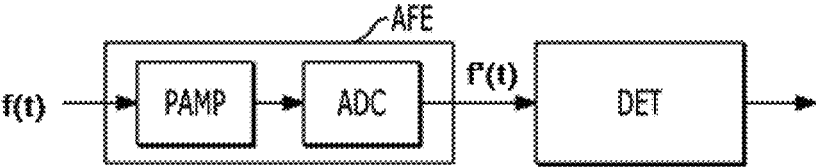

FIGS. 10 and 11 are diagrams illustrating a connection configuration of a touch sensing circuit according to the present embodiment.

Referring to FIGS. 10 and 11, a touch driver 210A may include a plurality of periodic signal generators GEN1, GEN2, . . . . GRNn. The periodic signal generators GEN1 and GEN2 may be individually connected to corresponding touch block driving lines BIL1 and BIL2. The periodic signal generators GEN1 and GEN2 may generate a plurality of periodic signals (e.g., touch block driving signals) having different frequencies to supply to the touch block driving lines BIL1 and BIL2.

A touch sensing unit 210B may include an analog-front end AFE and a frequency detector DET, which are individually connected to each touch line TL.

The analog-front end AFE may include an amplifier PAMP which amplifies and accumulates a sum signal f(t) based on touch block driving signals and an analog-to-digital converter ADC for digital-processing an output of the amplifier PAMP. The analog-to-digital converter ADC may supply a digital-processed signal f'(t) to the frequency detector DET.

Figure 12:
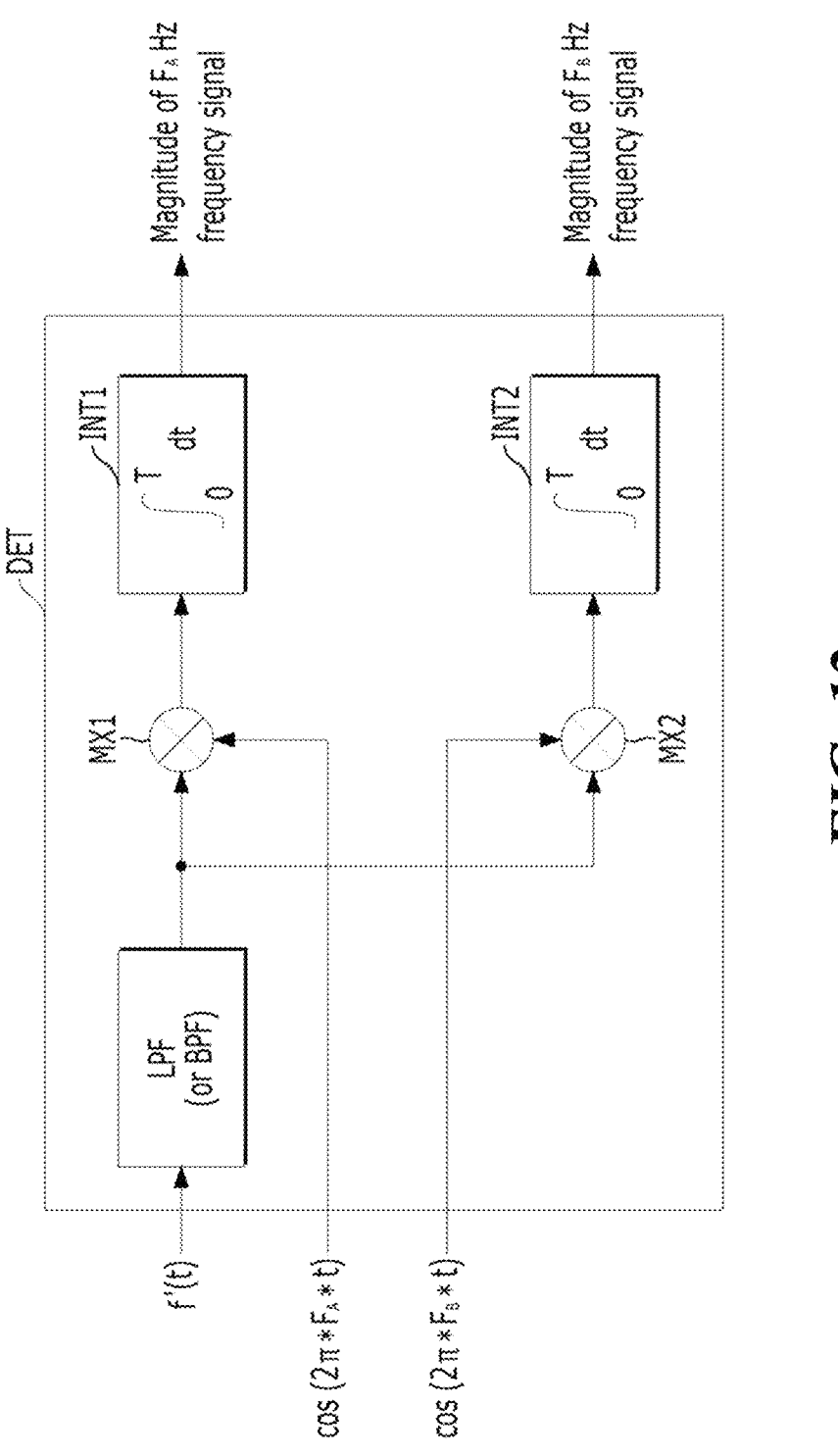
FIG. 12 is a diagram illustrating a configuration of a frequency detector included in a touch sensing circuit according to the present embodiment.

FIG. 12 is a diagram illustrating a configuration of a frequency detector included in a touch sensing circuit according to the present embodiment.

Referring to FIG. 12, a frequency detector DET may change the signal f' (t), input from the analog-to-digital converter ADC, from a time domain to a frequency domain.

The frequency detector DET may include a filtering unit, a plurality of multipliers MX1 and MX2, and a plurality of frequency converters INT1 and INT2.

The filtering unit may include a low pass filter LPF or a band pass filter BPF. The filtering unit may remove white noise included in the signal f'(t).

The plurality of multipliers MX1 and MX2 may multiply a plurality of periodic signals "$\cos(2\pi*F_A*t),\cos(2\pi*F_B*t)$" having the same frequency as the sum signal f(t).

The plurality of frequency converters INT1 and INT2 may perform, by one period T, an integral on outputs of the plurality of multipliers MX1 and MX2 to output a magnitude signal corresponding to each of the plurality of periodic signals "$\cos(2\pi*F_A*t),\cos(2\pi*F_B*t)$". As the signal f'(t) is multiplied by a periodic signal having a frequency which differs from the signal f'(t), an output of a frequency converter may be 0. On the other hand, as the signal f'(t) is multiplied by a periodic signal having the same frequency as the signal f'(t), an output of the frequency converter may represent two magnitudes of the signal f(t).

The plurality of frequency converters INT1 and INT2 may convert a touch line-based sensing signal into a frequency domain signal by using Fourier transform and may thus represent a different magnitude, based on whether there is a touch input.

The plurality of frequency converters INT1 and INT2 may output to represent one of a first magnitude and a second magnitude in a first frequency of the frequency domain signal and may output to represent one of a third magnitude and a fourth magnitude in a second frequency of the frequency domain signal. In this case, the first magnitude and the third magnitude may correspond to a non-touch input, the second magnitude and the fourth magnitude may correspond to a touch input, the second magnitude may be less than the first magnitude, and the fourth magnitude may be less than the third magnitude.

When a touch line-based sensing signal is converted into the frequency domain signal, an original magnitude may appear by half in each of (+) direction and (−) direction.

Accordingly, a magnitude A of a first periodic signal "A $\cos(2\pi*F_A*t)$" may be "first magnitude*2," and a magnitude B of a second periodic signal "B $\cos(2\pi*F_A*t)$" may be "third magnitude*2."

The present embodiment may realize the following effect.

The present embodiment may differentiate a real touch position from a ghost position in a multi-touch input and may thus prevent the occurrence of a phenomenon where an actually untouched point is abnormally recognized as a touch position.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch sensing display device comprising:
a first touch block including a plurality of first touch electrodes and a first additional electrode pattern that individually partitions the plurality of first touch electrodes, the first additional electrode pattern positioned between every two adjacent first touch electrodes of the plurality of first touch electrodes;
a second touch block including a plurality of second touch electrodes and a second additional electrode pattern that individually partitions the plurality of second touch electrodes, the second additional electrode pattern positioned between every two adjacent second touch electrodes of the plurality of second touch electrodes;
a touch driver configured to supply a first periodic signal having a first frequency to the first additional electrode pattern through a first touch block driving line and supply a second periodic signal having a second frequency different from the first frequency to the second additional electrode pattern through a second touch block driving line; and
a touch sensing circuit configured to sense touch lines each connecting one of the plurality of first touch electrodes to one of the plurality of second touch electrodes.

2. The touch sensing display device of claim 1, wherein the first additional electrode pattern is configured to perform a function of a transmission antenna for transmitting the first periodic signal,
the second additional electrode pattern is configured to perform a function of a transmission antenna for transmitting the second periodic signal, the plurality of first touch electrodes are configured to perform a function of a reception antenna for receiving the first periodic signal from the first additional electrode pattern, and the plurality of second touch electrodes are configured to perform a function of a reception antenna for receiving the second periodic signal from the second additional electrode pattern.

3. The touch sensing display device of claim 1, wherein the touch sensing circuit is configured to sense a sum signal of the first periodic signal having the first frequency and the second periodic signal having the second frequency through each of the touch lines and to convert a touch line-based sensing signal, obtained through sensing, into a frequency domain signal.

4. The touch sensing display device of claim 3, wherein the line-based sensing signal represents one of a first magnitude or a second magnitude in the first frequency of the frequency domain signal and represents one of a third magnitude or a fourth magnitude in the second frequency of the frequency domain signal, the first magnitude and the third magnitude correspond to a non-touch input, and the second magnitude and the fourth magnitude correspond to a touch input, the second magnitude is less than the first magnitude, and the fourth magnitude is less than the third magnitude.

5. The touch sensing display device of claim 4, wherein a magnitude of the first periodic signal is twice as much as the first magnitude, and a magnitude of the second periodic signal is twice as much as the third magnitude.

6. The touch sensing display device of claim 5, wherein the magnitude of the first periodic signal is equal to the magnitude of the second periodic signal.

7. The touch sensing display device of claim 5, wherein the magnitude of the first periodic signal differs from the magnitude of the second periodic signal.

8. The touch sensing display device of claim 3, wherein the touch sensing circuit comprises:

a plurality of analog-front ends connected to the touch lines to output the touch line-based sensing signal; and a plurality of frequency detectors configured to convert the touch line-based sensing signal into the frequency domain signal.

9. The touch sensing display device of claim 1, wherein the first additional electrode pattern has a mesh shape that surrounds each of the plurality of first touch electrodes in a same plane, and the second additional electrode pattern has a mesh shape that surrounds each of the plurality of second touch electrodes in a same plane.

10. A display device comprising:

a first touch block including a first plurality of touch electrodes and a first additional electrode pattern adjacent to the first plurality of touch electrodes, the first additional electrode pattern positioned between every two adjacent touch electrodes of the first plurality of touch electrodes;

a second touch block including a second plurality of touch electrodes and a second additional electrode pattern adjacent to the second plurality of touch electrodes, the second additional electrode pattern positioned between every two adjacent touch electrodes of the second plurality of touch electrodes;

a touch driver configured to supply a first periodic signal having a first frequency to the first additional electrode pattern through a first touch block driving line and to supply a second periodic signal having a second frequency different from the first frequency to the second additional electrode pattern through a second touch block driving line;

a first touch line connected to only one first touch electrode of the first plurality of touch electrodes and to only one first touch electrode of the second plurality of touch electrodes; and a second touch line connected to only one second touch electrode of the first plurality of touch electrodes and to only one second touch electrode of the second plurality of touch electrodes.

11. The display device according to claim 10, wherein the first plurality of touch electrodes and the second plurality of touch electrodes do not overlap one another.

12. The display device according to claim 10, wherein the first plurality of touch electrodes and the second plurality of touch electrodes include a same number of touch electrodes.

13. The display device according to claim 10, wherein the first additional electrode pattern surrounds each of the first plurality of touch electrodes.

14. The display device according to claim 13, wherein the first additional electrode pattern is positioned between every two adjacent touch electrodes of the first plurality of touch electrodes.

15. The display device according to claim 13, wherein the first additional electrode pattern includes a mesh shape.

16. The display device according to claim 10, wherein the first additional electrode pattern does not abut the first plurality of touch electrodes.

17. A display device comprising:

a first touch block including a first plurality of touch electrodes and a first additional electrode pattern adjacent to the first plurality of touch electrodes, the first additional electrode pattern configured to transmit a first signal to the first plurality of touch electrodes, the first additional electrode pattern positioned between every two adjacent touch electrodes of the first plurality of touch electrodes;

a second touch block including a second plurality of touch electrodes and a second additional electrode pattern adjacent to the second plurality of touch electrode, the second additional electrode pattern configured to transmit a second signal different from the first signal to the second plurality of touch electrodes, the second additional electrode pattern positioned between every two adjacent touch electrodes of the second plurality of touch electrodes;

a first touch line connected to only one first touch electrode of the first plurality of touch electrodes and to only one first touch electrode of the second plurality of touch electrodes; and a second touch line connected to only one second touch electrode of the first plurality of touch electrodes and to only one second touch electrode of the second plurality of touch electrodes.

18. The display device of claim 17, wherein the first signal includes a first frequency and the second signal includes a second frequency different from the first frequency.

19. The display device of claim 17, further comprising a first touch sensing unit coupled to the first touch line and a second touch sensing unit coupled to the second touch line.

20. The display device of claim 19, wherein each of the first touch sensing unit and the second touch sensing unit includes an analog-front end and a frequency detector.

* * * * *